United States Patent

Bishop

[15] 3,707,663

[45] Dec. 26, 1972

[54] CLOSED LOOP CONTROL FOR STEPPING MOTOR DRIVE

[72] Inventor: Everett R. Bishop, Waynesboro, Va.

[73] Assignee: General Electric Company

[22] Filed: April 23, 1971

[21] Appl. No.: 136,852

[52] U.S. Cl. ....................318/685, 318/563
[51] Int. Cl. ....................G05b 19/40
[58] Field of Search ....................318/6, 685, 696, 563

[56] References Cited

UNITED STATES PATENTS

| | | | |
|---|---|---|---|
| 3,359,474 | 12/1967 | Welch et al. | 318/696 |
| 3,247,433 | 4/1966 | Lasch et al. | 318/696 |
| 3,553,549 | 1/1971 | Leenhouts | 318/696 |

*Primary Examiner*—T. E. Lynch
*Attorney*—William S. Wolfe, Gerald R. Woods, Frank L. Neuhauser, Oscar B. Waddell and Joseph B. Forman

[57] ABSTRACT

A stepping motor drive for a perforated tape reader. The energization of the stepping motor is controlled by a ring counter driven by a pulse generator. The control loop is closed by a feedback signal indicative of whether the tape sprocket hole is in a read or a non-read position. The generation of a pulse is inhibited unless the tape was driven to a new read position by a previously-generated pulse.

10 Claims, 4 Drawing Figures

*INVENTOR.*
EVERETT R. BISHOP

BY Gerald R. Woods

HIS ATTORNEY

CLOSED LOOP CONTROL FOR STEPPING MOTOR DRIVE

BACKGROUND OF THE INVENTION

The present invention relates to motor control circuits and more particularly to a control circuit for a stepping motor drive wherein a feedback signal from a controlled member controls the stepping of the motor.

Perforated tape is a widely used medium for supplying part program data to numerical control systems. Such tape may have eight positions or tracks in which holes representing a coded character may be punched and a ninth position for a sprocket hole. Depending upon the characteristics of the numerical control system, the data is applied either to buffer storage for later use or to the numerical control itself for immediate use in controlling the position of a member.

The movement of tape through the tape reader is not necessarily continuous. Tape motion may be interrupted, both at the end of a program and during the execution of a program, for a number of reasons. For example, a buffer memory may be temporarily filled to capacity by input data during execution of a program. To prevent the loss of subsequent data, the tape must be halted until the buffer memory has room for such data. In one prior art tape drive, a capstan on one side of the tape path is continuously rotated by an a.c. drive motor. The tape is driven through the reader by forcing a freely turning pinch roller on the other side of the tape path against the capstan. The pinch roller may be mounted on a rocker arm, the position of which is controlled by an electromagnetic actuator. Friction between the capstan and the tape pulls the tape through the reader. When the tape is to be stopped, the electromagnetic actuator is de-energized to separate the capstan and the pinch roller. The de-energization of the electromagnet results in simultaneous energization of a braking electromagnet located on one side of the tape. When energized, the braking electromagnet attracts a brake shoe located on the opposite side of the tape. The attracted brake shoe clamps the tape against the housing of the braking electromagnet to immediately stop the tape. The mechanical complexity of the above-described arrangement naturally makes it an expensive arrangement to build and to maintain.

To simplify a tape reader drive, a stepping motor can be directly connected to a sprocket wheel. Because the stepping motor can be rapidly started and stopped, pinch rollers, capstans and electromagnetic brakes are not necessary. Tape movement is regulated instead by means of a motor control circuit which varies the energization of stator windings of the stepping motor to cause the motor to step through rotation.

A problem which may occur where a stepping motor is used to drive a perforated tape is that the motor may, under certain conditions, be overloaded and lose synchronism with the motor control commands. Loss of synchronism due to motor overloading can occur where the tape becomes tangled or where there is simply too much tape for the motor to drive at a steady speed. When momentary desynchronization occurs, it is possible for the stepping motor to drive the tape one step backward and then forward again when the tape is released. The reason for this momentary reversal of tape is best illustrated by example. Assume that the stepping motor is a three-phase motor in which stator windings are energized in a 1, 2, 3, 1, 2, 3 etc., sequence when the stepping motor is to drive the tape in a forward or read direction. Assume also that the tape becomes jammed when the first stator winding of the stepping motor is energized. In known prior art arrangements, the motor control circuit continues to sequentially energize the stator windings of the stalled stepping motor. If it is the third stator winding of the stepping motor which is energized when the tape is later released, the motor rotor may step backwards one step rather than forward two steps to bring the rotor into correspondence with the energized third winding.

As a consequence of this momentary tape reversal, the rape reader repeats the reading of a single previously read character. The repeated reading of the single character can have the effect of raising an input quantity by a power of 10. To illustrate, assume the instruction punched in the tape would normally cause the tool or the workpiece to move 2 inches on the X axis. If a zero in the data block containing the 2-inch quantity is read twice due to a momentary tape reversal, the numerical control associated with the tape reader could accept the quantity as 20 inches rather than 2 inches. Obviously, when the machine tool attempts to move 20 inches rather than 2 inches along the X axis, the workpiece being machined and the machine tool could be ruined.

SUMMARY OF THE INVENTION

The present invention prevents desynchronization between a stalled stepping motor and the motor control circuit. The invention is embodied in a control circuit which includes a counting means connected to the stator windings of the stepping motor for sequentially energizing the windings to establish a rotating electromagnetic field. The counting means is driven through a repetitive counting sequence by a pulse-generating means. To prevent desynchronization, the pulse-generating means is connected to a feedback means which responds to the position of the controlled member being driven by the stepping motor. Unless the controlled member was driven into a desired position by the stepping motor in response to the previously-generated pulse acting through the counting means, the feed-back means inhibits generation of the next pulse.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

Figures 1, 2, 3, 4:
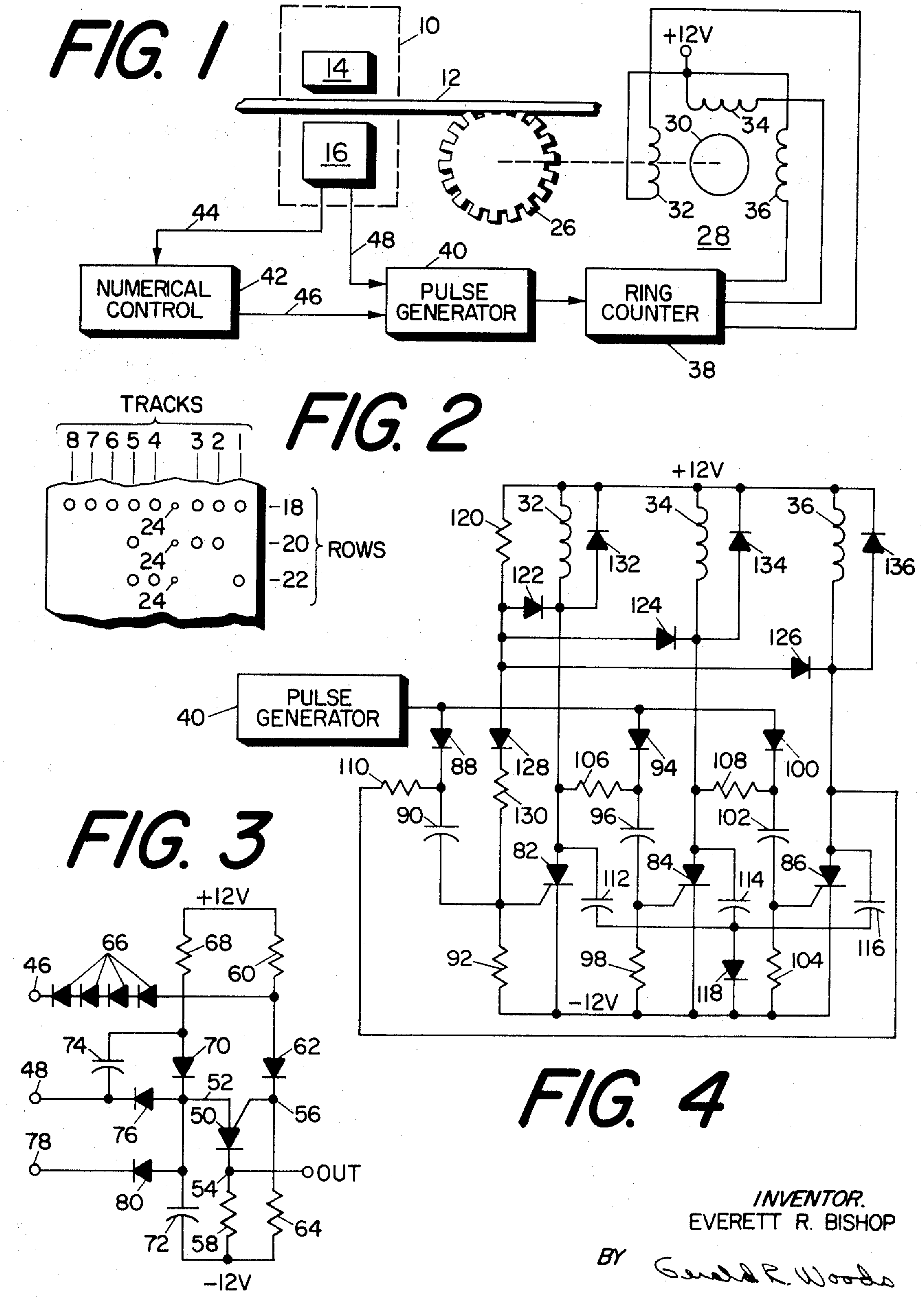
FIG. 1 is a block diagram of a tape reader drive incorporating the present invention.
FIG. 2 is a top view of a short length of perforated tape showing the arrangement of data tracks and sprocket holes.
FIG. 3 is a schematic diagram of a preferred embodiment of a pulse generator for use with the present invention.
FIG. 4 is a schematic diagram of a preferred embodiment of a ring counter for use with the present invention.

FIG. 1 depicts a tape reader including a read head 10 which senses the pattern of holes in a perforated tape 12 and develops corresponding logic level signals. Read head 10 can be a mechanical type but is preferably a photoelectric type capable of handling higher numbers of characters per second. A photoelectric read head 10 includes a light source 14 located on one side of the perforated tape 12 and an array 16 of photosensors located on the opposite side of the perforated tape 12. The number of photosensors in the array 16 is determined by the number of tracks in each row of information in the perforated tape 12. These terms are defined with reference to FIG. 2 which is a top view of the perforated tape 12. Three rows 18, 20, 22 of holes are illustrated. Each row has eight positions or tracks which may be punched to represent a single digital character or command in coded form. The tape reader 10 includes lens assemblies (not shown) for focusing the light emitted by light source 14 into a narrow strip of light directed toward the photosensors in the array 16. When the tape is in a read position wherein the light strip impinges upon a single row of holes, light passing through punched holes causes the associated photosensor to generate a certain voltage. If the light is blocked due to the lack of a hole in a particular track, the photosensor associated with that track generates another, normally lower voltage. In a preferred embodiment of the invention, the voltage generated when a hole is sensed is defined as a logic 1 signal, whereas the voltage generated when no hole is sensed is defined as a logic 0 signal.

Each of the rows 18, 20, 22 includes a sprocket hole 24 located between the third and fourth tracks. The sprocket hole 24 receives the teeth on a driven sprocket wheel 26 shown in FIG. 1 which pulls the tape through the tape reader, bringing successive rows into a read position in the read head 10. Sprocket wheel 26 is driven by a directly-connected three-phase stepping motor 28 having a rotor 30 and a stator with windings 32, 34, 36. While each winding is shown as a single winding, it should be understood that the windings would probably be distributed about the periphery of the stator to limit the size of the motor steps. One end of each of the stator windings 32, 34, 36 is connected to a positive voltage bus whereas the other end of each of the windings is connected to a ring counter 38. For the three-phase stepping motor 28, ring counter 38 counts through a three-state repetitive counting sequence under the direction of pulses provided by a pulse generator 40.

The primary function of the tape reader is to provide input data for a data utilization device which, in one application of the present invention, may be a numerical control 42. Logic level signals for each of the eight tracks of the perforated tape 12 are applied to numerical control 42 over a cable 44. The numerical control 42, in turn, controls the operation of pulse generator 40 through a connector 46. Another input to the pulse generator 40 is provided by a photosensor which senses the sprocket holes 24 of the perforated tape 12. The signal generated by this photosensor is a logic 1 whenever a sprocket hole is in a read position and a logic 0 whenever a sprocket hole is not in a read position; i.e., when the tape is moving from one read position to the next. These logic level signals are applied to pulse generator 40 through a second connector 48.

Before describing the basic operation of the tape reader stepping motor drive, it should be noted that the output 46 from numerical control 42 can be regarded simply as an enable/inhibit or on/off signal which indicates whether the numerical control 42 is ready to accept more input data. The output 46 does not, for example, change if the tape 12 binds causing the stepping motor 28 to stall. The description which follows assumes that connector 46 carries a continuous enabling signal which, in the described embodiment of the invention, is a logic 0 signal.

When power is applied to the stepping motor drive, the ring counter 38 is set into one of its three states by initialization circuitry to be described later. Depending upon the state into which ring counter 38 is set, one of the windings 32, 34, 36 is connected between the positive voltage bus shown and a negative voltage bus which has not been shown in FIG. 1. The established motor torque is transmitted by the rotor 30 to the sprocket wheel 26. If the tape is between read positions, the motor torque moves the tape into the read position determined by the winding energized. Once the tape is driven to the read position, the presence of a sprocket hole 24 is sensed by the associated photosensor and a logic 1 signal is generated. This logic 1 signal is applied to pulse generator 40 through the input 48 to enable the pulse generator 40 to generate a count-changing pulse. The count-changing pulse causes ring counter 38 to change states which, in turn, causes a different one of the stator windings 32, 34, 36 to be energized. Consequently, rotor 30 rotates through another step to pull the tape 12 through the tape reader.

If the next row in tape 12 is pulled into a read position, another logic 1 signal appears on input 48 to enable the pulse generator 40 to generate another count-changing pulse. As the ring counter 38 counts through its repetitive sequence, the stepping motor 28 is rotated in steps to pull the tape 12, row-by-row, through the tape reader. When the tape is between read positions, the signal on input 48 goes to a logic 0 level. The logic 0 signal effectively resets the pulse generator 40 so that the generator 40 can generate a pulse when the tape reaches its next read position. If the tape jams while a row is in the read position, the signal on input 48 remains at a logic 1 level and the pulse generator 40 is not reset. Therefore, as long as the tape remains jammed, the pulse generator 40 generates no further pulses, and the ring counter 38 remains in the same state. Similarly, if the tape jams when no row is in the read position, the logic 0 signal on terminal 48 inhibits the generation of pulses by pulse generator 40. Since the stepping motor 28 and the ring counter 38 are "-stalled" together, stepping motor 28 of necessity remains in synchronism with the commands provided by the control circuit.

To summarize, the pulse generator 40 must be reset by a logic 0 sprocket hole signal generated as one row leaves a first read position and must be triggered by a logic 1 sprocket hole signal as the next row enters a second read position before a next pulse can be generated to cause the tape to be driven forward from the second to a third read position read. Unless the pulse generator 40 is both reset and triggered by movement of the tape, the energization of the stepping motor 12 remains unchanged. It will be seen that the pulse generator 40, the ring counter 38 and the stepping motor 28 form a closed control loop which is completed by means of the feedback signal on input 48. Without such a feedback, pulse generator 40 and ring counter 38 would continually issue commands changing the energization of stator windings 32, 34, 36 even when rotor 30 was stalled.

The pulse generator 40 is shown in schematic form in FIG. 3. The pulse generator utilizes a programmable unijunction transistor 50, such as a 2Nput such having an anode terminal 52, a cathode terminal 54 and a gate terminal 56. The cathode terminal 54 of transistor 50 is the output terminal of the pulse generator 40. Cathode terminal 54 is connected to a negative voltage bus through a resistor 58. The gate terminal 56 is biased through a circuit including the series arrangement of a resistor 60, an optional temperature-compensating diode 62, and a second resistor 64. The opposite ends of the resistors 60 and 64 are connected to positive and negative voltage buses, respectively. The gate terminal 56 is connected to the junction of the diode 62 and the resistor 64 and would be biased to a voltage determined by the impedance of resistor 64 relative to the combined impedances of resistor 60 and diode 62 if there were no other inputs in the gate biasing circuit. An additional input to the gate biasing circuit exists, however, in the form of the connection 46 from the numerical control 42 to the junction of resistor 60 and diode 62 through serially-connected diodes 66.

The voltage between the anode terminal 52 and the negative voltage bus is controlled by an RC charging circuit, including a resistor 68, a diode 70 and a charging capacitor 72. The tape feedback signal on lead 48 is applied to the anode biasing circuit through a feedback circuit including a capacitor 74 connected between the anode of diode 70 and the terminal 48. The feedback circuitry further includes a diode 76 having its cathode connected to the terminal 48 and its anode connected to the anode of the programmable unijunction transistor 50.

The pulse generator 40 may include an inhibit terminal 78 which would be connected to the anode of the programmable unijunction transistor 50 through a diode 80. Normally, an inhibit terminal 78 carries a logic 1 signal and has no effect on the operation of the pulse generator. During start up and under certain emergency conditions, however, a logic 0 signal applied to terminal 78 clamps the voltage at the anode terminal 52 of programmable unijunction transistor 50 to a level below that at which transistor 50 will conduct.

The pulse generator 40 operates as described below. Assume that a logic 1 signal exists on terminal 48 indicating the tape is in a read position, that capacitor 72 is charging and that programmable unijunction transistor 50 is not conducting. Assume further that a logic 0 signal exists on terminal 46 while a logic 1 signal exists on inhibit terminal 78. The logic 0 signal on the terminal 46 clamps the voltage on the gate terminal 56 of transistor 50 to a value less than the value which can be attained at the anode terminal 52 of programmable unijunction transistor 50. Unless the gate terminal voltage is clamped in this manner, transistor 50 cannot be triggered into conduction. As capacitor 72 is charged by current through resistor 68 and diode 70, the positive potential on terminal 52 increases until it exceeds the potential on gate terminal 56. When this latter condition occurs, transistor 50 is driven into conduction and discharges capacitor 72 through cathode resistor 58 to provide a positive-going pulse at the cathode or output terminal 54. This output pulse causes the ring counter 38 to change states which, in turn, results in a change in the energization levels of the stator windings of the stepping motor 28. Consequently, the stepping motor 28 pulls one row of the tape 12 through the reader.

In the illustrated embodiment of pulse generator 40, the values of resistors 68 and 60 are chosen to sustain conduction through programmable unijunction transistor 50 after capacitor 72 discharges. When the tape moves from a read position, however, the signal at terminal 48 drops to a logic 0 level. The accumulated charge on capacitor 74 causes the diode 70 to be temporarily back biased, cutting off the flow of current through the resistor 68 to commutate programmable unijunction transistor 50. When the programmable unijunction transistor 50 is commutated, current flowing through resistor 68 and diode 70 charges capacitor 72. As long as no tape row is in a read position, the maximum voltage to which capacitor 72 can be charged is clamped by the logic 0 signal on terminal 48. Since clamped voltage is lower than the gate voltage, programmable unijunction transistor 50 cannot be driven into conduction until the tape enters a new read position and a logic 1 signal is applied to terminal 48. At that time, capacitor 72 starts to accumulate additional charge to further increase the anode voltage, eventually causing the programmable unijunction transistor 50 to generate another pulse.

To summarize the operation of the pulse generator, the programmable unijunction transistor 50 cannot be triggered into conduction until the tape 12 moves into a read position wherein a detected sprocket hole results in a logic 1 signal at the terminal 48. However, once the programmable unijunction transistor 50 is triggered into conduction, it continues to conduct until the movement of the sprocket hole from the read position causes a logic 0 signal to be re-established at terminal 48. The logic 0 signal temporarily cuts off the conduction of current into the anode terminal 52 to commutate programmable unijunction transistor 50. If the tape jams while in a read position, the programmable transistor 50 remains in its conductive state, whereas if the tape jams between read positions, the programmable transistor 50 remains in its non-conductive state.

FIG. 4 is a schematic diagram of one form of ring counter which may be used to implement the present invention. The ring counter 38 includes three silicon-controlled rectifiers 82, 84, 86, each of which is connected in series with one of the stator windings 32, 34, 36 between a positive voltage bus and a negative voltage bus. The gating circuit for SCR 82 includes the series combination of a diode 88, a capacitor 90, and a resistor 92 connected between the output of the pulse generator 40 and the negative voltage bus. The junction of the capacitor 90 and the resistor 92 is connected directly to the gate terminal of SCR 82. The gating circuit for SCR 84 includes a similarly connected arrangement of a diode 94, a capacitor 96, and a resistor 98. Likewise, the gating circuit for the SCR 86 includes a diode 100, a capacitor 102 and a resistor 104. To insure that SCR's 82, 84, 86 fire in proper sequence, the anode of SCR 82 is coupled to the gating circuit for SCR 84 through a steering resistor 106. Similarly, the anode of the SCR 84 is coupled to the gating circuit of the SCR 86 through a second steering resistor 108. The anode of the SCR 86 is coupled back to the gating circuit for the SCR 82 through a third steering resistor 110.

The ring counter 38 has a commutation circuit which includes capacitors 112, 114, 116 connected between the anodes of SCR's 82, 84, 86 and the anode of a diode 118 having its cathode connected to the negative voltage bus.

The ring counter 38 also includes an initialization circuit for limiting conduction to only one of the SCR's 82, 84, 86 when power is initially applied to the ring counter 38. The initialization circuit includes a first resistor 120 connected to the positive voltage bus and to the common anodic junction of a trio of diodes 122, 124, 126, each of which has its cathode connected to the anode of a different one of the SCR's 82, 84, 86. A fourth diode 128 also has its anode connected to the lower end of the resistor 120. Diode 128 is connected in series with a resistor 130 having one terminal connected directly to the gate terminal of the SCR 82.

Finally, the ring counter 38 includes free wheeling diodes 132, 134, 136 connected in parallel with the stator windings 32, 34, 36 respectively. The function of the diodes 132, 134, 136 is to suppress the inductive voltage which is generated by turning off the current which had been supplied to the associated motor winding. Although not shown in FIG. 4, a resistor could be placed in series with each free-wheeling diode to increase the rate of dissipation of energy, thereby permitting higher stepping rates. Such an arrangement is well known in the art.

The operation of the ring counter 38 is as follows. Assuming that none of the SCR's 82, 84, 86 is triggered into conduction when power is applied to the ring counter, current flowing through resistor 120 is directed to the series arrangement of diode 128, resistor 130, and resistor 92 rather than through one of the diodes 122, 124, 126. The voltage established between the gate and the cathode of the SCR 82 triggers that SCR into conduction, causing its anode voltage to approach the voltage level of the negative bus. As a consequence of this conduction, a voltage on the order of 24 volts is established across the stator winding 32. Concurrently, the negative anode voltage is coupled through steering resistor 106 to the cathode of diode 94 in the gating circuit for SCR 84. This negative coupling discharges capacitor 96 to bias the diode 94 to pass the next positive-going pulse produced by the pulse generator 40. When the next pulse is produced, it is applied through forward-biased diode 94 and capacitor 96 to the gate terminal of the SCR 84. The gate terminal is thus driven positive with respect to the cathode to trigger SCR 84 into conduction. A voltage on the order of 24 volts is established across the second stator winding 34.

When the SCR 84 fires, the negative voltage established at its anode drives the voltage on the lower plate of capacitor 114 to a negative value. This voltage drop is reflected through capacitor 112 to cause a similar voltage drop at the anode of previously-conducting SCR 82 which back biases and therefore commutates conduction through SCR 82. The negative voltage on the now-conducting SCR 84 is coupled through a steering resistor 108 to forward bias diode 100 to permit it to accept the next pulse from pulse generator 40. SCR 86 is triggered into conduction when the next pulse is received resulting in the energization of the stator winding 36, the commutation of conduction through SCR 84 through capacitors 116 and 114, and the forward biasing of diode 88 through steering resistor 110 to condition the gating circuit for SCR 82 to accept the succeeding pulse produced by pulse generator 40. The ring counter counts through the three-step repetitive sequence, changing count states each time a pulse is produced by the pulse generator 40.

While there has been described what is considered to be a preferred embodiment of the present invention, it should be understood that variations and modifications in the invention may occur to those skilled in the art once they become familiar with the invention. For example, the invention is not limited to use with perforated tape readers. Any system wherein a stepping motor is used to drive a controlled member between successive preferred positions may make use of the invention if some means is provided for generating a signal indicating that the controlled member has actually reached the preferred position. As an example, a stepping motor may be used to drive a machine tool bed relative to a tool. By using a rotary or linear encoder to detect each potential detent position through which the machine tool bed is driven and by conditioning further stepping of the motor upon the requirement that the machine tool bed reach the last commanded position, it is assured that the machine tool bed is moved in synchronism with the commands provided to the stepping motor. Also, one skilled in the art can easily modify ring counter 38 to alter the count sequence so as to drive the tape in the opposite or reverse position.

Since variations such as those described above may occur to those skilled in the art, it is intended that the appended claims shall be construed to include all such variations, and modifications as fall within the true spirit and scope of the invention.

In the claims

1. For use in a tape reader having a stepping motor driven sprocket for moving a tape having sprocket holes therein between successive read positions, a control circuit comprising:

a. counting means having outputs connected to the stator windings of the motor for sequentially altering the energization of the windings to establish a rotating electromagnetic field.

b. pulse generating means for driving said counting means through a repetitive counting sequence; and c. feedback means connected to the tape reader and said pulse generator, said feedback means being responsive to the presence and absence of sprocket holes for inhibiting the generation of a pulse unless the tape has been driven into a previously commanded read position by the stepping motor in response to the previously generated pulse.

2. A control circuit as recited in claim 1 wherein said counting means comprises a ring counter having a number of count states equal to the number of stator phase windings of the stepping motor.

3. A control circuit as recited in claim 1 wherein said pulse generating means further comprises:

a. a programmable unijunction transistor having anode, cathode and gate terminals with the cathode terminal being the output terminal;

b. biasing means for maintaining the gate terminal potential at a substantially constant level;

c. a charging circuit including a capacitor connected between the anode terminal and a first voltage bus and the series combination of a first diode and a resistor connected between the anode terminal and a second voltage bus.

4. A control circuit as recited in claim 3 wherein said feedback means includes:

a. a second diode having its anode terminal connected to the anode terminal of the programmable unijunction transistor;

b. a capacitor having one terminal connected to the anode of the first diode and the other terminal connected to the cathode of the second diode;

c. means for applying a first voltage to the junction of said capacitor and said second diode when the tape is in a read position and a second voltage to said junction when the tape is in other than a read position.

5. A control circuit as recited in claim 4 wherein said last-named means comprises means for sensing whether a tape sprocket hole is in a read position.

6. A control circuit as recited in claim 5 further including inhibit means for preventing pulse generation independently of the position of the tape, said inhibit means including a diode having its anode connected to the anode of said unijunction transistor and its cathode adapted to be connected to the second voltage when inhibiting action is desired.

7. For use in a tape reader having a stepping motor for moving a tape having sprocket holes therein past a reading station, a control circuit comprising:

a. counting means having outputs connected to the stator windings of the motor for sequentially altering the energization of the windings to establish a rotating electromagnetic field;

b. sprocket hole sensing means for generating a signal indicating the presence and the absence of a sprocket hole at the reading station; and c. pulse generating means responsive to said signal for driving the counting means through a repetitive counting sequence, the pulse generating means driving the counting means after said signal indicates that a sprocket hole has left the reading station and that a next sprocket hole has arrived at the reading station.

8. A control circuit as recited in claim 7 wherein said counting means comprises a ring counter having a number of count states equal to the number stator phase windings of the stepping motor.

9. A control circuit as recited in claim 7 wherein the sprocket hole sensing signal is a first voltage when a sprocket hole is at the reading station and a second voltage when there is no sprocket hole at the reading station and wherein the pulse generating means comprises:

a. a programmable unijunction transistor having an anode, cathode and gate terminals, said cathode terminal being connected to the counting means;

b. first circuit means connected to the programmable unijunction transistor gate terminal for providing a biasing voltage for the gate terminal; and c. second circuit means, connected to the anode terminal and responsive to the sprocket hole sensing signal so that the transition from said first voltage to said second voltage causes the programmable unijunction transistor to be non-conductive and the subsequent appearance of said first voltage causes the programmable unijunction transistor anode voltage to be greater than the gate biasing voltage whereby the programmable unijunction transistor becomes conductive and a pulse is generated for driving the counter means.

10. A control circuit as recited in claim 9 wherein the second circuit means comprises:

a. a capacitor connected between the programmable unijunction transistor anode terminal and a first voltage bus;

b. a first diode having a cathode connected to the programmable unijunction transistor anode terminal;

c. a resistor connected between the anode of the first diode and a second voltage bus;

d. a second diode having an anode connected to the transistor anode terminal and a cathode connected to the sprocket sensing signal; and e. a capacitor connected between the anode of the first diode and the cathode of the second diode.

* * * * *